United States Patent
Azuma et al.

(10) Patent No.: US 6,357,759 B1
(45) Date of Patent: Mar. 19, 2002

(54) JACKET SEAL

(75) Inventors: Yoshio Azuma, Tokyo; Takayoshi Mitsui; Takahiro Kariya, both of Wakayama, all of (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 09/502,566

(22) Filed: Feb. 11, 2000

(30) Foreign Application Priority Data

Feb. 15, 1999 (JP) ............................................. 11-035497

(51) Int. Cl.[7] ................................................. F16J 15/12
(52) U.S. Cl. ........................ 277/602; 277/608; 277/611; 277/612; 277/626; 277/647
(58) Field of Search ................................. 277/612, 611, 277/595, 647, 644, 913; 285/910, 917

(56) References Cited

U.S. PATENT DOCUMENTS

| | | | | |
|---|---|---|---|---|
| 3,033,582 A | * | 5/1962 | Creavey | 277/180 |
| 3,188,100 A | * | 6/1965 | Delgado | 277/205 |
| 3,722,898 A | * | 3/1973 | von Benningsen | 277/206 |
| 4,561,662 A | * | 12/1985 | de Villepoix et al. | 277/229 |
| 4,618,154 A | * | 10/1986 | Freudenthal | 277/205 |
| 5,022,663 A | | 6/1991 | Fages et al. | |
| 5,076,617 A | | 12/1991 | Bronnert | |
| 5,265,890 A | * | 11/1993 | Balsells | 277/163 |

* cited by examiner

Primary Examiner—Anthony Knight
Assistant Examiner—Matthew E. Rodgers
(74) Attorney, Agent, or Firm—Eric J. Robinson; Nixon Peabody LLP (57) ABSTRACT

In order to achieve constantly stable, high seal performance without requiring high machining accuracy, and in order to provide a reusable jacket seal, the present invention discloses a jacket seal, wherein a projection is formed at a position of a metal jacket in opposite relationship with a seal surface of a member being sealed, a flat portion is formed in an elastic member within the metal jacket so as to be brought into surface-to-surface contact with a flange portion interior surface, and the vertex portion of the projection is formed flat.

12 Claims, 12 Drawing Sheets

JACKET SEAL

BACKGROUND OF THE INVENTION

This invention relates in general to jacket seals, and in particularly to seals (gaskets) suitably used with pipes or containers which are internally evacuated of air.

In the field of semiconductor, it is desired to completely eliminate any foreign materials present in a product, to enhance vacuum and to make the inside of pipes for vacuum drawing to be cleaner in order to manufacture high-performance products capable of performing advanced technology functions. Accordingly, even in the case of seals for use in joints of pipes or the like for vacuum drawing, such a seal is required not to give off, from itself, gas or particles into the pipe.

In the case of using an O ring of rubber as a seal, the components of the rubber ring are emitted, by vacuum drawing, into a pipe in a gaseous form or in a particle form. Also, a gas outside the pipe permeates through the rubber and enters into the pipe. Accordingly, rubber O rings are unfit for vacuum seals. The rubber O ring is not suitably used where a fluid, which attacks rubber, flows through the pipe, either. On the other hand, an O ring of metal emits no foreign materials of the type described above. The metal O rings however, requires heavier clamping pressure to perform an effective seal function. It is therefore essential to provide a mechanism capable of achieving a heavy clamping pressure at joint portions of a vacuum apparatus. This, however, produces the problem that the apparatus itself increases in size. In order to enhance the clamping pressure, for example, the number of clamping bolts must be increased, which may cause some problems in construction that layout space for bolts cannot be reserved and that members being sealed hardly sustains the clamping pressure. Thus, the apparatus increases in size.

Figure 13:
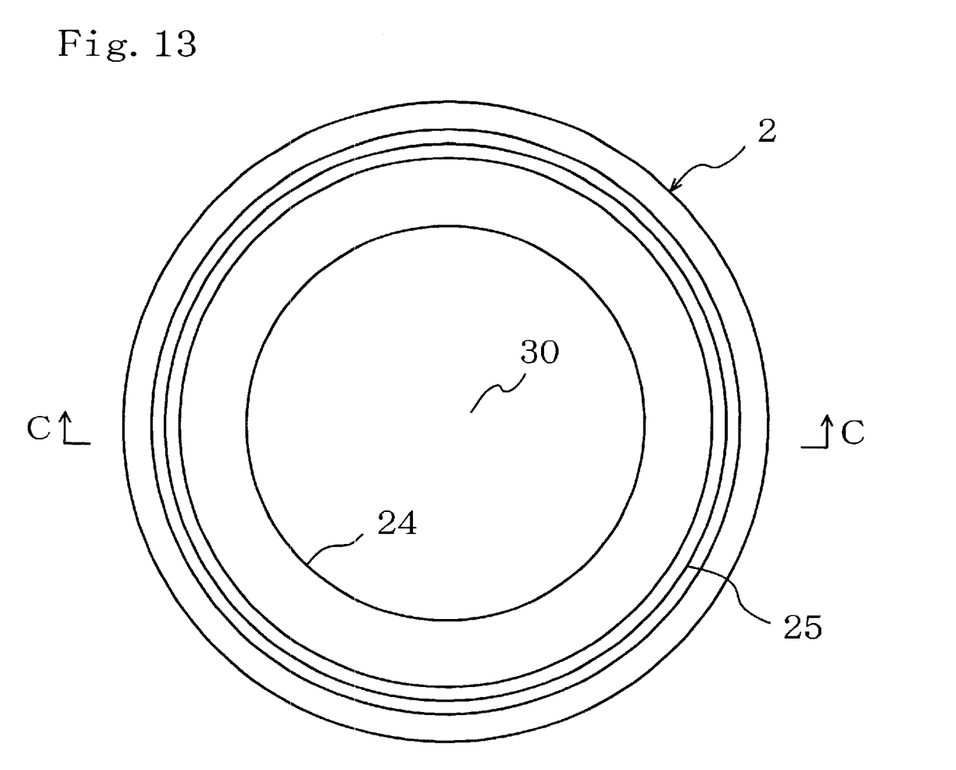
FIG. 13 shows a plan view of a conventional jacket seal.
Figure 14:
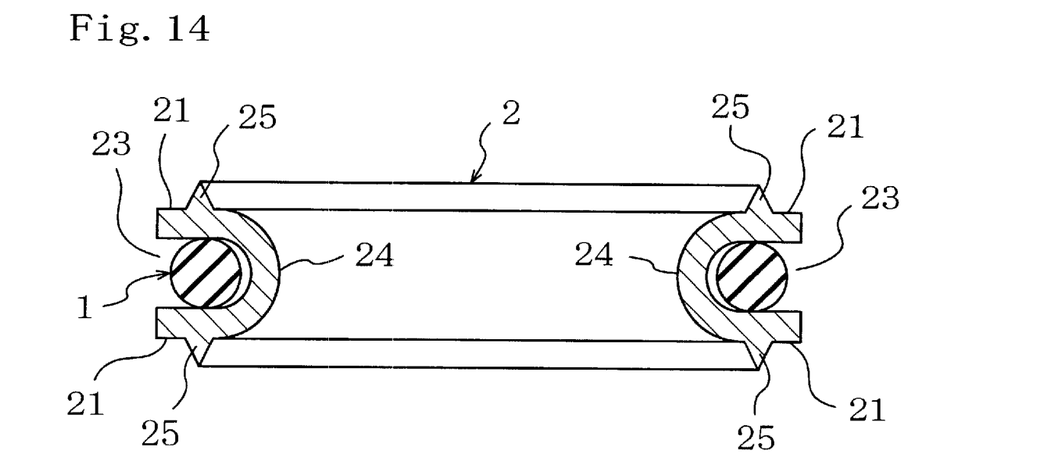
FIG. 14 shows a cross-sectional view taken along line C—C of FIG. 13.

To cope with such a problem, as shown in FIGS. 13 and 14, a jacket seal, which emits no foreign material into a space 30 being sealed, which involves no gas permeation and which requires no heavy seal clamping pressure, is employed. In the jacket seal, an elastic member 1 having a cross section of circular shape is accommodated in a metal jacket 2 which has, at its outer peripheral surface, an opening portion 23, and projections 25 and 25 having a cross section of triangular shape are annularly formed on surfaces 21 and 21 being squeezingly compressed (exterior surfaces of flange portions) of the metal jacket 2, these surfaces 21 and 21 being in opposite relationship with seal surfaces of members being. sealed.

In such a jacket seal, an inner peripheral surface 24 and the being-compressed surfaces 21 and 21 are all formed of metal, so that inclusion of foreign materials into the being-sealed space 30 is unlikely to occur. Furthermore, the projection 25 of the being-compressed surface 21 has a vertex point which abuts against the seal surface of the being-sealed member and which is then crushed by seal clamping pressure to come into close contact with the seal surface of the being-sealed member. Meanwhile, the metal jacket 2 is deflected by seal clamping pressure such that the opening portion 23 is made narrower. At the same time, the elastic member 1 held in the metal jacket 2 also undergoes compressive deformation, as a result of which reaction force against the seal clamping pressure can be obtained from the metal jacket 2 and from the elastic member 1. Accordingly, such a jacket seal makes it possible to obtain sufficient seal effects without the necessity of achieving a heavy clamping pressure.

In a conventional jacket seal, in order to obtain high seal performance with small clamping pressure, it is arranged such that the projection 25 having a cross section of triangular shape has a vertex point which is finished relatively sharp so that the projection 25 is easily crushed and small clamping pressure is concentrated on the vertex point to improve sealability. In addition, in order to hold down costs, an O ring of rubber superior in versatility is also used as the elastic member 1 that is accommodated in the metal jacket.

Figure 16:
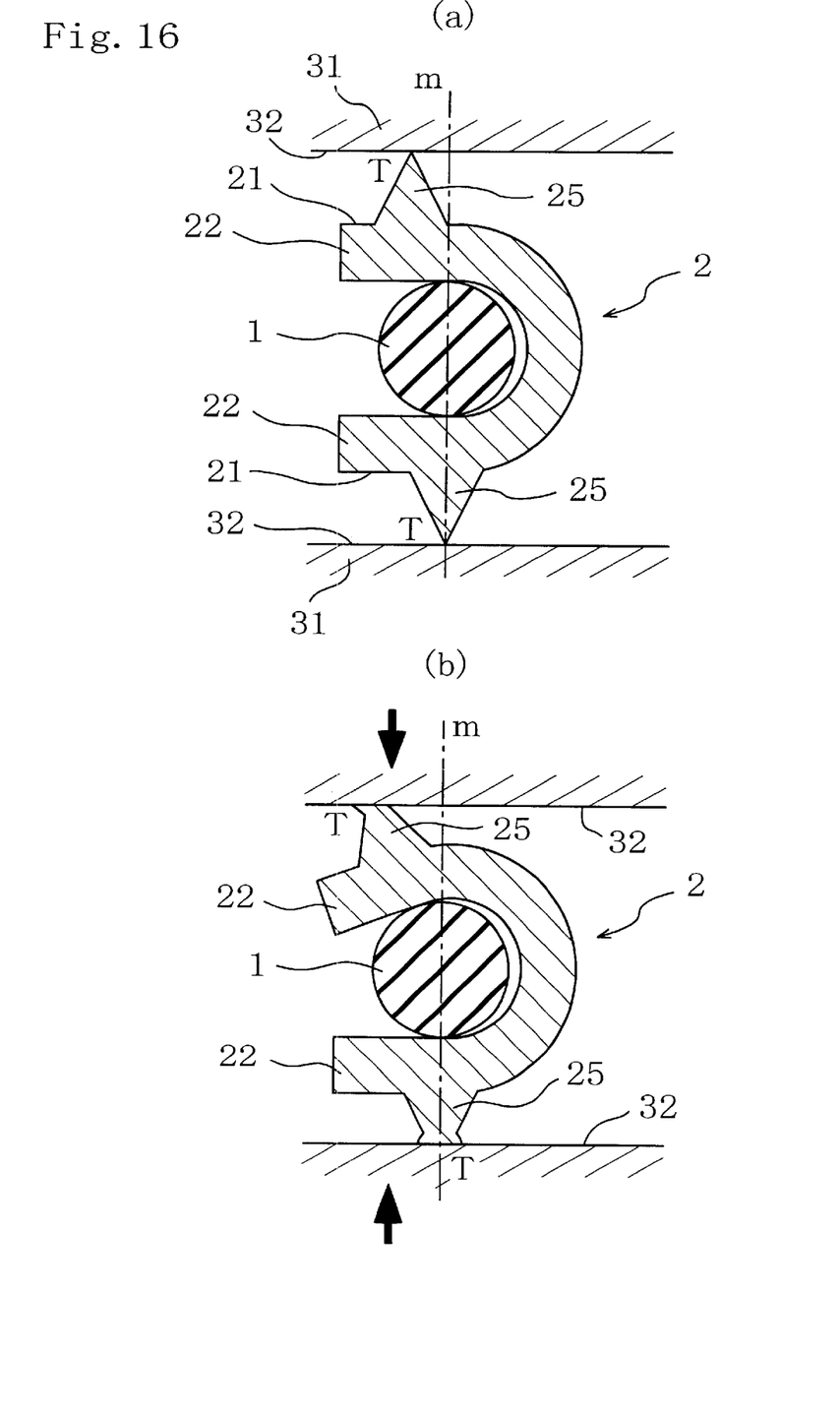
FIG. 16 shows cross-sectional views illustrating a phenomenon causing abnormal deformation of a flange portion.

However, the performance of jacket seals may vary depending on the machining accuracy of the metal jacket 2. For example, as shown in FIG. 16(a), if the position of a vertex point T of the projection 25 formed on the being-compressed surface 21 of the metal jacket 2 in opposing relationship with the seal surface 32 of the being-sealed member, deviates from a centerline m in a cross section of the elastic member 1 accommodated in the metal jacket 2, then proper reaction force will not be obtained from the elastic member 1 upon application of clamping pressure, so that a flange portion of the metal jacket 2 itself may distort to undergo plastic deformation, as shown in FIG. 16(b). Accordingly, in some cases, a desired seal performance is not obtained. Moreover, once a jacket seal has undergone plastic deformation, it is impossible to reuse such a plastically-deformed seal, which means that when disassembling a pipe joint for the purpose of maintenance/inspection or the like, there is produced the problem that a new jacket seal must be prepared, which is uneconomical.

Figure 15:
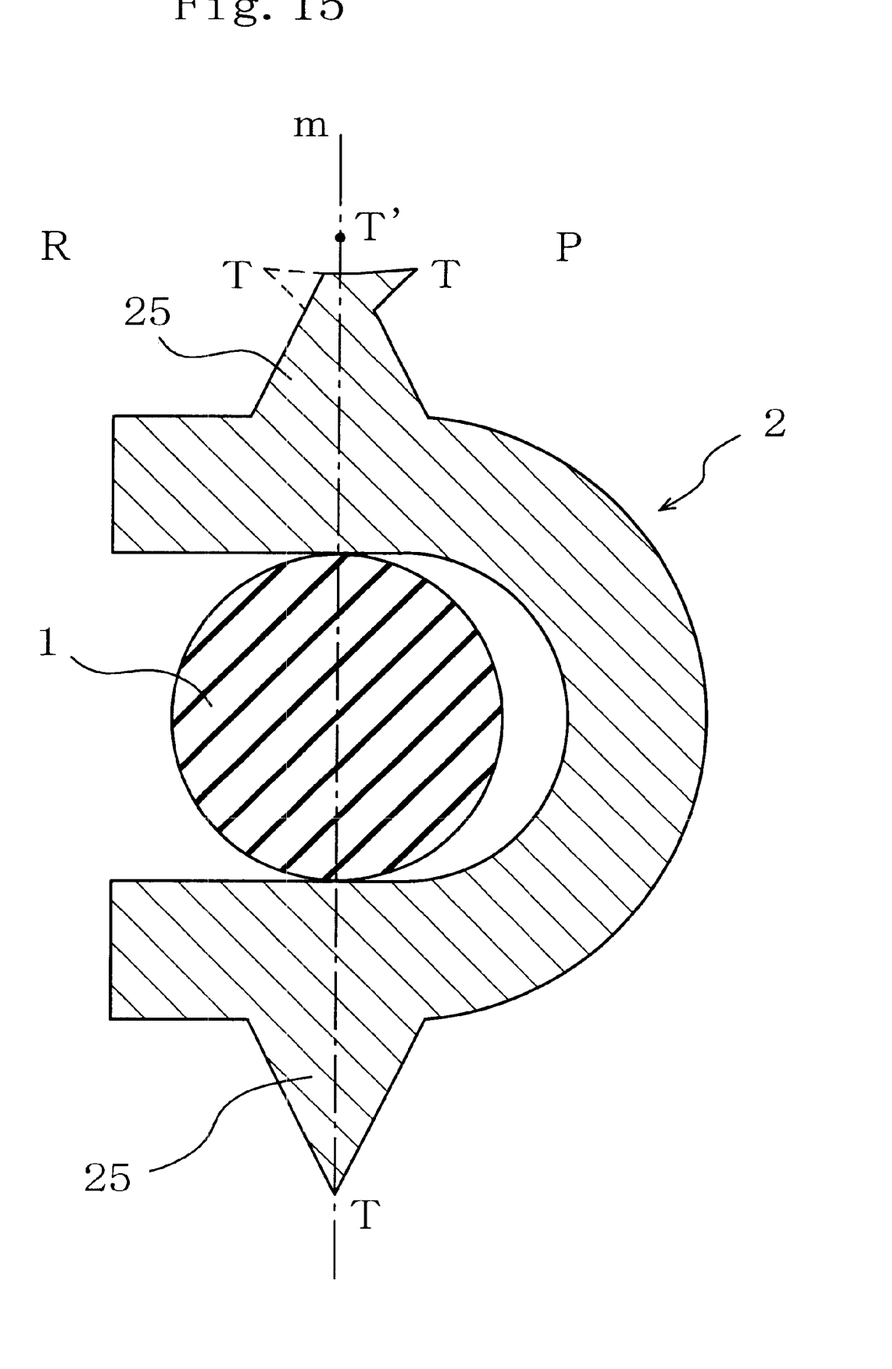
FIG. 15 shows a cross-sectional view illustrating variations in the direction in which the projecting end of the conventional jacket seal collapses.

Moreover, the projection 25, formed on the being-compressed surface 21 of the metal jacket 2, is finished sharp pointed for the purpose of improving sealability. However, when the projection 25 is finished sharp pointed, a burr or a flash is created at an endmost portion of the projection 25, which results in poor machining accuracy. Accordingly, when clamped, the projection 25 will not be crushed uniformly over its full length, and, as shown in FIG. 15, in the projection thus crushed, two sections are mixedly present. More specifically, one of the sections (indicated by solid line) results from the collapse of the end T of the projection 25 from its original position T' prior to the crush toward P (the inside (central side) of the seal), while the other of the sections (indicated by broken line) results from the collapse of T from T' toward R (the outside of the seal). Therefore a target seal performance cannot be achieved at a point of inflection where the direction, in which the projection 25 collapses, changes from the side P to the side R, and a phenomenon, in which there occurred a drop in the seal performance, was observed.

Accordingly, an object of the present invention is to provide solutions to these problems.

Moreover, another object of the present invention is to constantly achieve high seal performance without requiring high machining accuracy.

Furthermore, still another object of the present invention is to provide a jacket seal which is stable in quality and which can be reused.

SUMMARY OF THE INVENTION

In order to solve the above-described problem, the present invention discloses a jacket seal comprising (a) a metal jacket having an annular web portion and a pair of flange portions projecting outward from sides of the web portion, respectively, and (b) an elastic member accommodated in the metal jacket, wherein the metal jacket includes a projection which is annularly formed at an exterior surface of each of the flange portions and which abuts against a seal surface of a member being sealed (i.e., a pipe or a container to be sealed), and the elastic member includes a flat portion which abuts against an interior surface of each of the flange portions of the metal jacket.

In the jacket seal of the present invention, the flat portion is in surface-to-surface contact with a position of the interior surface of each of the flange portions of the metal jacket corresponding to the projection.

In the jacket seal of the present invention, the projection has a cross section of approximately triangular shape whose vertex angle is 50 degrees or more.

The present invention discloses a jacket seal comprising (a) a metal jacket having an annular web portion and a pair of flange portions projecting outward from sides of the web portion, respectively, and (b) an elastic member accommodated in the metal jacket, wherein the metal jacket includes a projection which is annularly formed at an exterior surface of each of the flange portions and the projection has a vertex portion which is formed flat over the full circumferential length so as to abut against a seal surface of a member being sealed.

In the jacket seal of the present invention in which the projection vertex portion is formed flat, the elastic member includes a flat portion which abuts against a position of an interior surface of each of the flange portions of the metal jacket corresponding to the projection.

In the jacket seals of the present invention, the elastic member has a cross section of approximately D-letter shape.

The present invention discloses a jacket seal comprising (a) a metal jacket having an annular web portion and a pair of flange portions projecting outward from sides of the web portion, respectively, and (b) an annular elastic member accommodated in the metal jacket, wherein the metal jacket includes a projection which is annularly formed at an exterior surface of each of the flange portions and which abuts against a seal surface of a member being sealed, and the elastic member includes a contact portion which establishes contact with a position of an interior surface of each of the flange portions of the metal jacket corresponding to the projection at a width greater than the width of the projection and at an approximately uniform pressure, in a relaxed state in which no clamping pressure is acting on the metal jacket.

The present invention discloses a jacket seal comprising (a) a metal jacket having an annular web portion and a pair of flange portions projecting inward or outward from sides of the web portion, respectively, and (b) an annular elastic member accommodated in the metal jacket, the jacket seal being clamped between seal surfaces of members being sealed and, in order to prevent components of the elastic member from being emitted into either one of an inner space and an outer space, the web portion is directed toward one of the spaces and the flange portions at both sides thereof are formed so as to project toward the other of the spaces, thereby to prevent a fluid from communicating between the inner space and the outer space, wherein the metal jacket includes a projection which is annularly formed at an exterior surface of each of the flange portions and which abuts against the seal surface, and the elastic member establishes surface-to-surface contact with a position of an interior surface of each of the flange portions of the metal jacket corresponding to the projection at a width greater than the width of the projection, in a relaxed state in which no clamping pressure is acting on the metal jacket.

The present invention discloses a jacket seal comprising (a) a metal jacket having an annular web portion and a pair of flange portions projecting outward from sides of the web portion, respectively, and (b) an annular elastic member accommodated in the metal jacket, wherein the metal jacket includes a projection which is annularly formed at an exterior surface of each of the flange portions and which abuts against a seal surface of a member being sealed, the elastic member includes a contact portion which establishes contact the a position of an interior surface of each of the flange portions of the metal jacket corresponding to the projection at an approximately uniform pressure, in a relaxed state in which no clamping pressure is acting on the metal jacket, and an endmost portion of the projection is positioned within a region corresponding to the width of the contact portion.

The present invention discloses a jacket seal comprising (a) a metal jacket having an annular web portion and a pair of flange portions projecting inward or outward from sides of the web portion, respectively, and (b) an annular elastic member accommodated in the metal jacket, the jacket seal being clamped between seal surfaces of members being sealed and, in order to prevent components of the elastic member from being emitted into either one of an inner space and an outer space, the web portion is directed toward one of the spaces and the flange portions at both the sides thereof are formed so as to project toward the other of the spaces, thereby to prevent a fluid from communicating between the inner space and the outer space, wherein the metal jacket includes a projection which is annularly formed at an exterior surface of each of the flange portions and which abuts against the seal surface, the elastic member establishes surface-to-surface contact with a position of an interior surface of each of the flange portions of the metal jacket corresponding to the projection, in a relaxed state in which no clamping pressure is acting on the metal jacket, and an endmost portion of the projection is positioned within a region corresponding to the width of the surface-to-surface contact.

The present invention discloses a jacket seal comprising a metal jacket having an annular web portion and a pair of flange portions projecting inward or outward from sides of the web portion, respectively, and an elastic member formed by filling unvulcanized rubber into the metal jacket over the full circumferential length thereof and subjecting the filled unvulcanized rubber to vulcanization so as to be adhered to interior surfaces of the web portion and the flange portions at both the sides of the web portion.

In the jacket seal of the present invention making utilization of the foregoing unvulcanized rubber, the metal jacket includes a projection which is annularly formed at an exterior surface of each of the flange portions and which abuts against a seal surface of a member being sealed.

In the jacket seal in accordance with the present invention, it is arranged such that the elastic member includes a flat portion which abuts against an interior surface of each of the flange portions of the metal jacket, which results in that the contact area of the elastic member with respect to each of the flange portions of the metal jacket increases and the contact surface comes to have a certain width. Therefore, reaction force against clamping pressure can stably be obtained without having to achieve a close correspondence between the vertex point of a projection of one of the flange portions and the vertex point of a projection of the other of the flange portions in a direction in which clamping pressure is applied. Moreover, with the flat portion which abuts against the interior surface of each of the flange portions, it is no longer necessary to specifically arrange the vertex point of the projection on a cross-sectional centerline of the elastic member and no high machining accuracy is required at a position where the projection is formed, even when employing, as an elastic member, a rubber O ring having a cross section of approximately circular shape. Moreover, the flange portions of the metal jacket are held in plane by the elastic member, which therefore prevents the flange portions from being plastically deformed.

Particularly, if the foregoing flat portions are formed in such a way as to come to abut against a position of the interior surface of each of the flange portions of the metal jacket corresponding to the projection, this provides the advantage of stably achieving reaction force against clamping pressure, and it is sufficient that the vertex point of the projection is provided within the surface-to-surface contact width in point. Moreover, it is preferable to form the flat portion over the full circumferential length of the elastic member in order to stably obtain clamping reaction force.

Additionally, also in the case of forming a contact portion in the elastic member which establishes contact with a position of the interior surface of each of the flange portions of the metal jacket corresponding to the projection at a width greater than the width of the projection and at an approximately uniform pressure in a relaxed state in which no clamping pressure is acting on the metal jacket, the same operation effects as in the case in which the foregoing flat portion is formed can be obtained. Also in this case, it is preferable to form the contact portion over the full circumferential length of the elastic member in order to stably obtain clamping reaction force.

In addition, even with the contact portion having a narrower width than that of the projection, the similar effects in case with the flat portion can be attained if the endmost portion of the projection is positioned within the region corresponding to the width of the contact portion.

Further, also when the foregoing elastic member is brought into surface-to-surface contact with a position of the interior surface of each of the flange portions of the metal jacket corresponding to the projection at a width greater than the width of the projection in a relaxed state in which no clamping pressure is being applied to the metal jacket, the same operation effects as in the case in which the foregoing flat portion is formed can be obtained. It is preferable for the elastic member to be brought into surface-to-surface contact with an inner peripheral surface of each of the flange portions, over the full circumferential length.

In addition, even with the surface-to-surface contact having a narrower width than that of the projection, the similar effects in case with the flat portion can be attained if the endmost portion of the projection is positioned within the region corresponding to the width of the surface-to-surface contact.

Although the foregoing elastic member is not necessarily brought into contact with an interior surface of the web portion of the metal jacket, such contacting with the interior surface of the web portion, particularly contacting with the entire inner peripheral surfaces of the flange and web portions, will produce the advantage of stably obtaining the foregoing clamping reaction force. When a metal jacket has a cross section of laterally-collapsed U-letter shape defined by the web portion and the pair of flange portions of the metal jacket, in other words, when the metal jacket has a cross section of D-letter shape without a vertical stroke line thereof, if the elastic member is formed to have a cross section of D-letter shape, that is, if a D ring is employed as the elastic member, this makes it possible to bring the elastic member into surface-to-surface contact with substantially the entire inner peripheral surface of the metal jacket.

Moreover, if it is arranged such that the projection has a cross section of approximately triangular shape whose vertex angle is set at 50 degrees or more, this arrangement facilitates forming of a projection end portion to a further extent in comparison with when the vertex angle is set at not more than 50 degrees, and therefore reduces variation in the machining accuracy at the projection end portion without the drop in seal performance.

Additionally, if it is arranged such that the vertex portion of the projection is formed flat over the full circumferential length so as to come to abut against a seal surface of a member being sealed, then the post-clamping direction in which the projection is crushed will be stable without requiring high machining accuracy. In other words, the entire vertex portion of the projection is uniformly crushed by a surface to be compressed squeezingly, thereby eliminating the presence of a mixture of directions in which the projection end collapses as described previously. Accordingly, a desired seal performance can be obtained and variations in the sealability from one product to another is eliminated thereby to improve seal productivity.

Moreover, if it is arranged such that the vertex portion of the projection is formed flat and that the elastic member is provided with a flat portion which abuts against an inner peripheral surface of each of the flange portions of the metal jacket, then the vertex portion of the projection will undergo a stable crush as described above and reaction force against clamping pressure can stably be obtained, whereby a target seal performance can be obtained easily without requiring high machining accuracy for the position and the end shape of the projection. As a result, the variation in jacket seal performance by machining accuracy can be controlled and the problem that the flange portions of the metal jacket undergo plastic deformation can be dispelled.

Further, since it is possible to control the plastic deformation of the flange portions, this makes it possible to reuse a jacket seal depending on its state of use. Accordingly, when disassembling equipment such as a pipe joint to which the present jacket seal has been applied for the purpose of inspection and maintenance, there is no need to prepare a new jacket seal, which is also advantageous in view of the economical aspect.

Moreover, a jacket seal, in which an elastic member having a cross section of D-letter shape is filled into the foregoing metal jacket having a cross section of laterally-collapsed U-letter shape, may be formed as follows. First, unvulcanized rubber is filled into the metal jacket over the full circumferential length of the jacket and the unvulcanized rubber thus filled is subjected to vulcanization so as to be adhered to interior surfaces of the web portion and the flange portions at both sides of the web portion of the metal jacket. Because of such arrangement, there is no need to prepare a metal mold used to manufacture a D ring, which is cost effective.

As a material for the elastic member that is accommodated in the metal jacket, (a) rubber such as natural rubber, ethylene propylene rubber, ethylene propylene diene rubber, acrylonitrile-butadiene rubber, hydrogenated acrylonitrile-butadiene rubber, styrene-butadiene rubber, silicone rubber, chroloprene rubber, chlorosulfonated polyethylene rubber, fluorine rubber, fluoridated silicone rubber, acrylic rubber, and ethylene acrylic rubber or its crosslinked rubber, (b) thermoplastic elastomer such as thermoplastic elastomer of the polystyrene system, thermoplastic elastomer of the polyolefin system, thermoplastic elastomer of the polyvinyl chloride system, and thermoplastic elastomer of the polyester system, and (c) expanded plastic can be used and it is preferable to use materials which exhibit no crystal melting point on the differential calorimetry curve in a differential scanning calorimeter (DSC).

The elastic member can be manufactured by, for example, press- or injection-molding a composition obtained by blending, as necessity requires, conventional amounts of agents normally used in the manufacturing of elastic members, such as antioxidant agents, antiaging agents, reinforcing agents (e.g., carbon black), talc, fillers (e.g., clay), crosslinking agents, crosslinking assist agents, crosslinking accelerators, and processing aids. The elastic member 1 made of a crosslinked rubber is heat crosslinked in a molding step of a press or injection molding process.

As a metal used to form the metal jacket, various metals can be used except for metals which exhibit thermal instability, chemical instability, or mechanical instability in a seal use environment. Especially, hard or soft metals (e.g., metals having relatively good machinability including aluminum, aluminum alloy, copper, copper alloy, and magnesium alloy and metal-ceramic composite) can preferably be used so that an opening portion formed in the metal jacket can be narrowed by relatively small clamping pressure. Additionally, it is preferred that the metal jacket is formed using a material which is softer than a being-sealed member or a material which is plastically deformed easily in order that the projection may be crushed when forced by pressure into contact with a seal surface of the being-sealed member.

PREFERRED EMBODIMENTS OF THE INVENTION

Referring now to the attached drawing figures, the present invention will be described below in detail.

Embodiment 1

FIGS. 1 to 6 illustrate a first embodiment of the present invention. In the annular jacket seal 10 illustrated in FIGS. 1 to 4, an annular elastic member is denoted by reference numeral 1 and a metal jacket is denoted by reference numeral 2.

Figure 1:
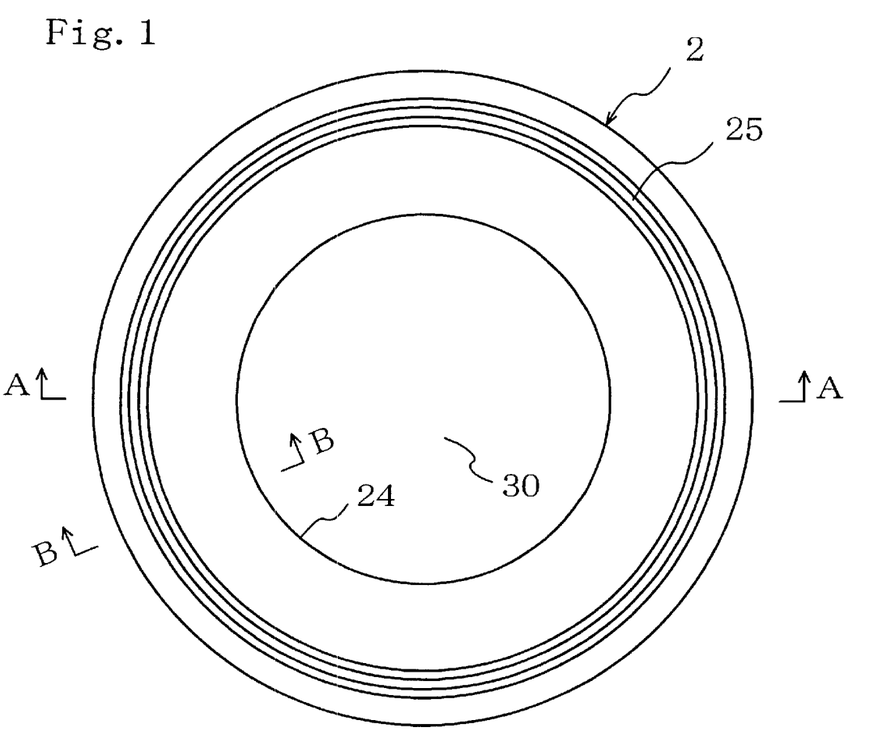
FIG. 1 shows a plan view of a jacket seal in accordance with a first embodiment of the present invention.
Figure 2:
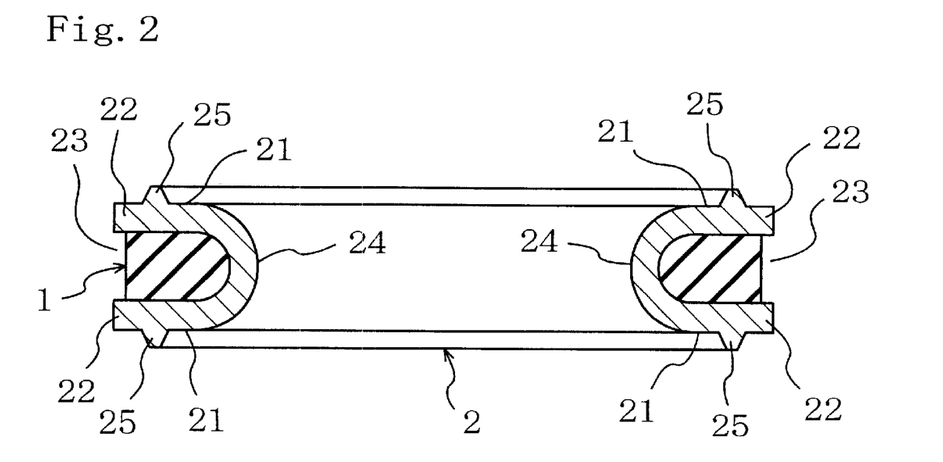
FIG. 2 shows a cross-sectional view of the jacket seal in a relaxed state (i.e., a non-clamping state) taken along line A—A of FIG. 1.
Figure 3:
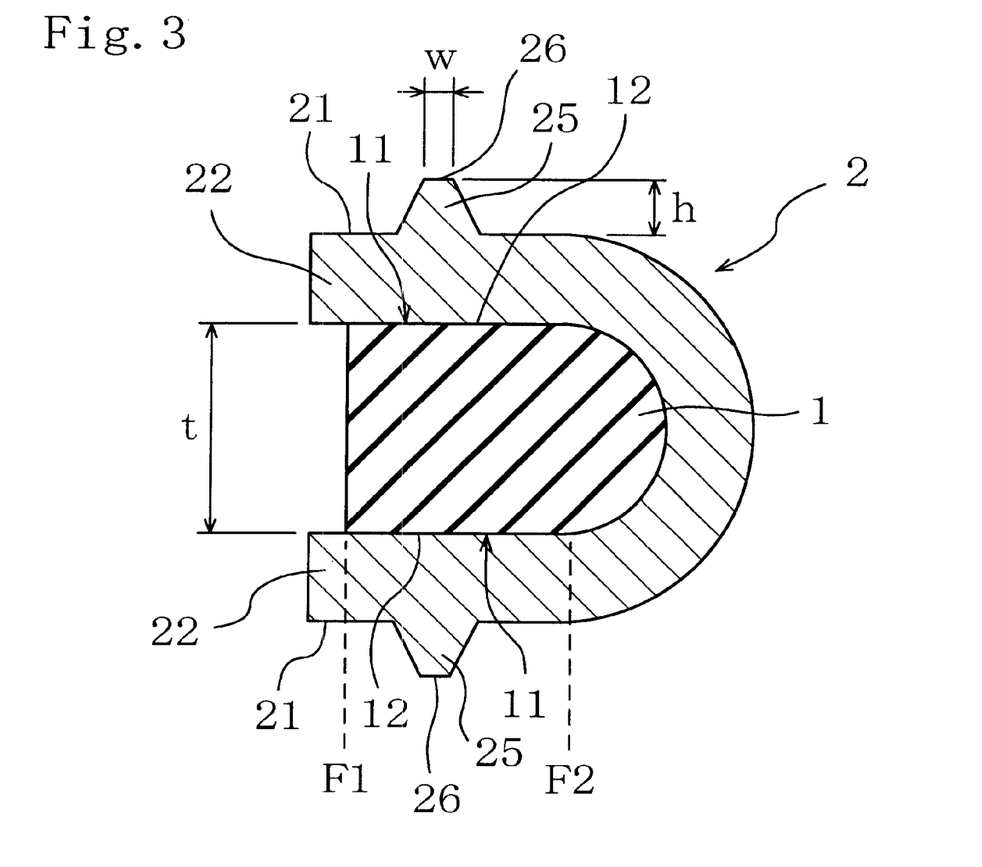
FIG. 3 shows an enlarged cross-sectional view of the jacket seal in a relaxed state taken along line B—B of FIG. 1.

The metal jacket 2 has an annular web portion 24 and a pair of flange portions 22 which project from sides of the web portion 24 toward the outside of the annulus, (i.e., in a radially outward direction), respectively, wherein an opening portion 23, which opens outward, is formed extending the full circumferential length. The web portion 24 is formed into a circular arc shape such that its central section becomes convex toward the inside of the annulus (in a radially inward direction), and the metal jacket 2 has, as a whole, a cross section of laterally-collapsed U-letter shape, with the opening portion facing outward. The metal jacket 2 houses therein (i.e., in its jacket portion) the annular elastic member 1.

Figure 4:
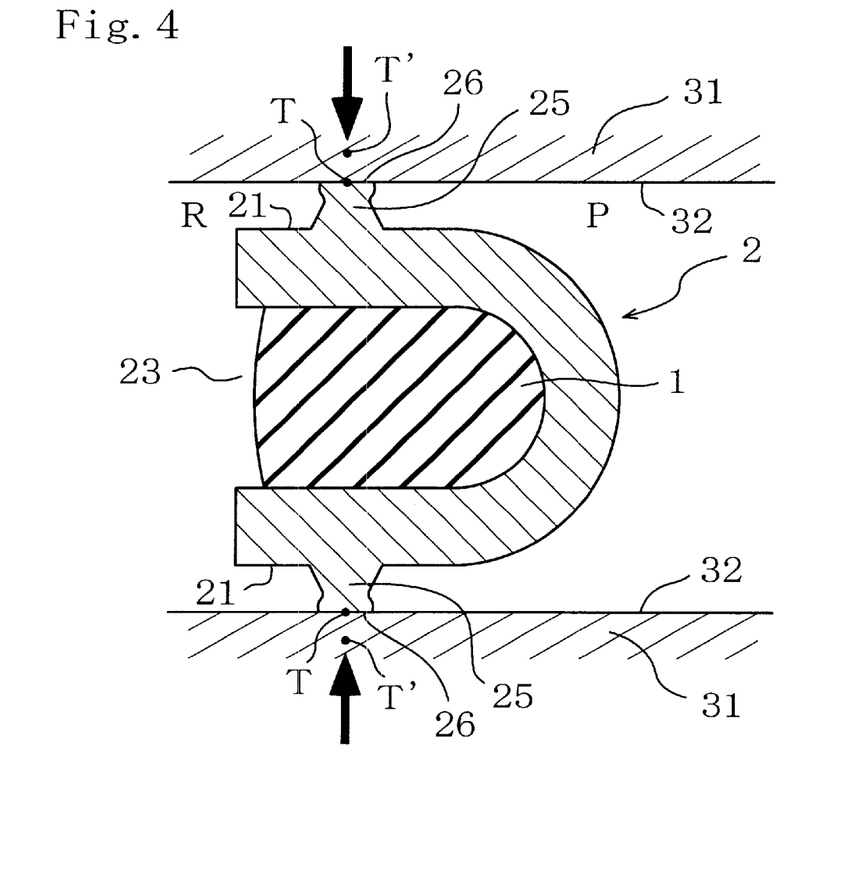
FIG. 4 shows a cross-sectional view similar to FIG. 3, illustrating a state in which the jacket seal is being clamped by a member being sealed.

As FIG. 4 shows, the jacket seal 10 is placed between members being sealed such that a seal surface (an end surface around the opening) 32 of the being-sealed member is in opposite relationship with a surface 21 being squeezingly compressed (i.e., an exterior surface of the flange portion 22 which receives pressure when the jacket seal 10 is clamped by the opposing seal surfaces 32, in other words when clamped), wherein seal clamping pressure is applied in the axial direction to seal the joint. If it is required that such seal clamping pressure be heavy, this requires the provision of a tool capable of generating a heavy seal clamping pressure in the being-sealed member. This results in increasing the being-sealed member in size. For example, the number of clamping bolts must be increased, which leads to less layout space for the bolts and thick being-sealed member capable of sustaining such the heavy seal clamping pressure. It is therefore arranged such that the being-compressed surface 21 is provided with a projection 25 having a cross section of trapezoid shape, to perform high seal performance with a small seal clamping pressure.

Moreover, in the jacket seal 10 of the present embodiment, a vertex (endmost) portion 26 of the projection 25 is formed flat so as to be brought into surface-to-surface contact with the seal surface 32 of the being-sealed member for adhesion thereto. In other words, the vertex portion 26 is formed into a flat surface in parallel with the seal surface 32 when placed face to face with the seal surface 32.

As shown in FIG. 4, at the time when seal clamping pressure is produced, the endmost portion of the projection 25 will collapse neither in the direction of P (inward) nor in the direction of R (outward). Therefore, the endmost portion of the projection 25 is crushed in the direction in which the seal clamping pressure is produced (in the direction indicated by arrow), and undergoes deformation. This ensures that the adhesion between the projection 25 and the seal surface 32 of the being-sealed member becomes stable, and that a being-sealed space 30 present inward to the web portion 24 can be maintained as a closed space.

With regard to the projection 25 and the flat vertex portion of the projection 25, if the projection 25 is formed too small in size, this results in poor seal performances. If the width of the vertex portion 26 is excessively great, this requires heavier seal clamping pressure in order to secure a surface pressure necessary for the establishment of sealing. Accordingly, as FIG. 3 shows, if the thickness of the elastic member 1 that is accommodated in the metal jacket 2 is t, then the height (h) of the projection 25 ranges from about 0.01 t to about 1.5 t, preferably from about 0.05 t to about 0.7 t. With regard to the width (w) of the vertex portion 26, the width w ranges from about 0.01 t to about 0.1 t, preferably from about 0.02 t to about 0.5 t. Moreover, the angle, formed between both side surfaces of the projection 25 (i.e., the vertex angle at the vertex point (T) of a triangle formed when the side surfaces extend), is preferably from about 50 degrees to about 130 degrees. Further, it is preferred that the vertex angle is an obtuse angle in excess of 90 degrees in order to provide easy machining as well as to prevent the occurrence of product variations caused by machining.

Moreover, formed in a surface 11 of the elastic member 1 which receives clamping pressure from the flange portion 22 of the metal jacket 2 is a flat portion 12 in contact with an interior surface of the flange portion 22. The flat portion 12, even when in a relaxed state in which the jacket seal 10 receives no clamping pressure, establishes surface-to-surface contact with at least a position of the interior surface of the flange portion 22 corresponding to the projection 25 over the full circumferential length, at a width greater than the vertex portion width (w) of the projection 25 and at an approximately uniform pressure. In the present embodiment, the elastic member 1 establishes, at its both side surfaces and inner peripheral surface, close surface-to-surface contact with the interior surface of the flange portion 22 and the inner peripheral surface of the web portion 24 of the metal jacket 2.

Upon generation of seal clamping pressure, the opening portion 23 undergoes deformation so that its opening width narrows by the generated seal clamping pressure. By virtue of the provision of the opening portion 23, even when seal clamping pressure applied is small, the metal jacket is sensitive to such application, and reaction force against the applied clamping pressure is generated from the elastic member 1. Such reaction force makes it possible to achieve sufficient seal performance.

Further, since the elastic member 1 is provided with the flat portion 12 so that the elastic member 1 has a flat contact surface which abuts against the flange portion 22, there is no need to form the projection 25 on a center line m in cross section of the elastic member 1, as shown in FIG. 15. That is to say, the projection 25 may be formed within a region of the flat portion 12 (within a range of F1–F2). Accordingly, high degree of machining accuracy is not required with regard to the position of forming the projection 25.

Figure 5:
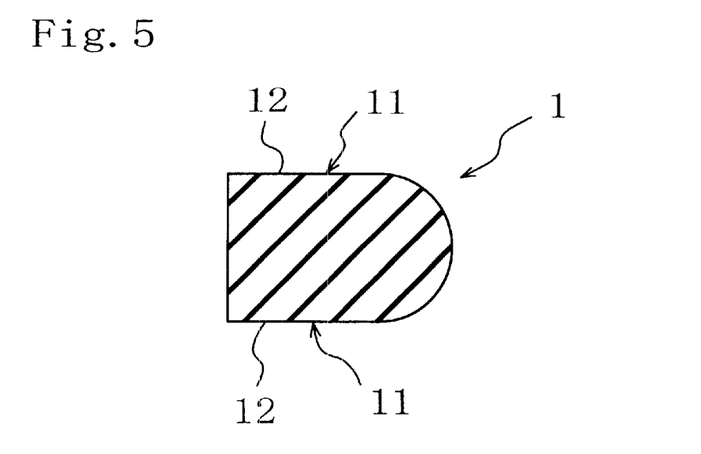
FIG. 5 shows a cross-sectional view of an elastic member in accordance with the first embodiment.

Moreover, since the metal jacket 2 is arranged inside where the web portion 24 receives, for example, vacuum drawing force, this prevents the components of the elastic member 1 from being emitted into the being-sealed space 30. Here, although it is preferable for the elastic member 1 to have a cross section of D-letter shape to the shape of the metal jacket 2 as shown in FIG. 5, any other shapes can be employed as long as the inside of the metal jacket 2 is filled.

The inner peripheral surface shape of the web portion 24 of the elastic member 1 may be formed into a linear form instead of a circular arc form, which, however, produces the problem that the elastic member 1 cannot be inserted deep into the inside of the metal jacket 2, and the formation region of the projection 25 may be narrowed.

Further, although the outer peripheral surface of the elastic member 1 may have a cross section of circular arc shape whose central section projects, it is more preferable for it to have a cross section of liner shape capable of effectively supporting the flange portion 22 of the metal jacket 2 from the inside, in order to control the abnormal deformation of the flange portion 22.

Furthermore, the thickness (t) of the elastic member 1 varies depending upon the purpose of usage of the present jacket seal and upon the size of apparatus requiring same; however, the thickness t ranges from about 0.05 mm to about 10 mm for an example case in which the present jacket seal is applied to commonly-used vacuum apparatus.

The foregoing jacket seal 10 can be manufactured as follows. That is, the pre-vulcanized, annular elastic member 1 is forcefully expanded to increase its diameter and is elastically inserted into the inside of the metal jacket 2. Alternatively, the following process may be employed to manufacture a jacket seal of the present embodiment.

Figure 6:
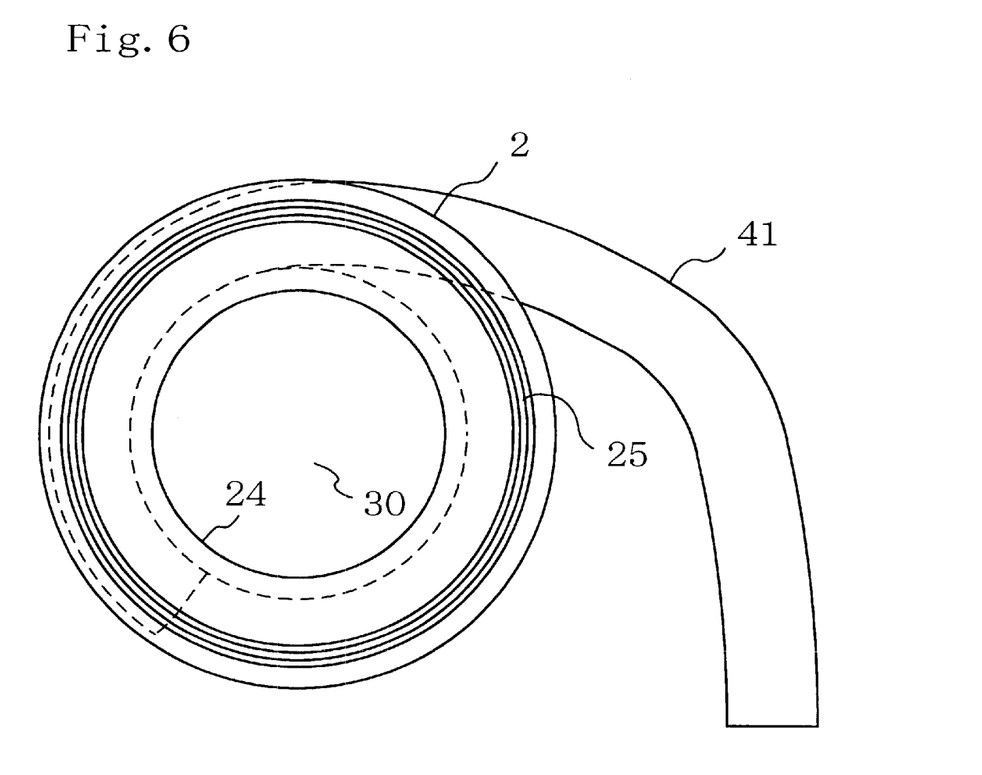
FIG. 6 shows a plan view illustrating one stage of the fabrication process of the jacket seal.

A. The metal jacket 2 is formed.
B. As FIG. 6 shows, a cord-like, unvulcanized rubber 41 is filled, staring with one end thereof, into the inside of the metal jacket 2, and such a stating end is connected to the other end, wherein the unvulcanized rubber 41 is filled in the jacket extending the full circumferential length thereof.
C. The unvulcanized rubber is pressurized from therearound while being heated for vulcanization, whereby the elastic member 1 is formed so as to be adhered to interior surfaces of the web portion 24 and the flange portions 22 (at both the sides of the web portion 24) of the metal jacket 2.

In accordance with this process, the metal jacket 2 serves as a metal mold used to form the elastic member 1 by vulcanization, so that there is no need to provide any metal mold dedicated to forming the elastic member 1.

Embodiment 2

Figure 7:
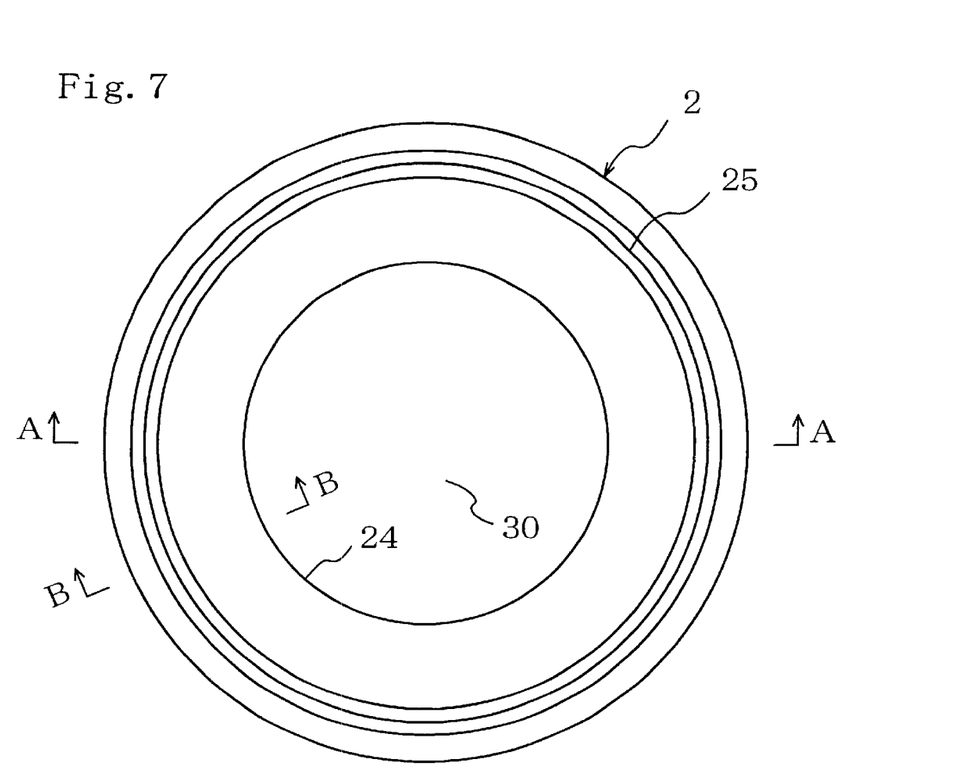
FIG. 7 shows a plan view of a jacket seal in accordance with the second embodiment of the present invention.
Figure 8:
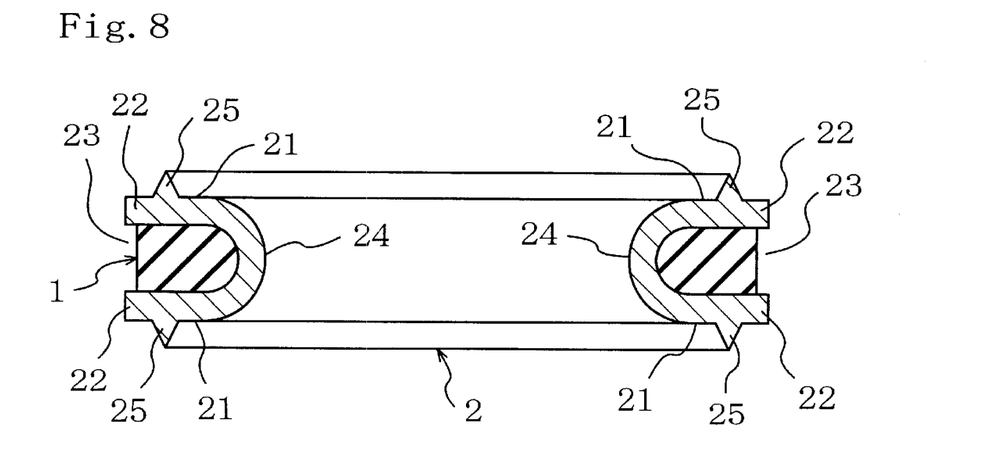
FIG. 8 shows a cross-sectional view of the jacket seal in a relaxed state taken along line A—A of FIG. 7.
Figure 9:
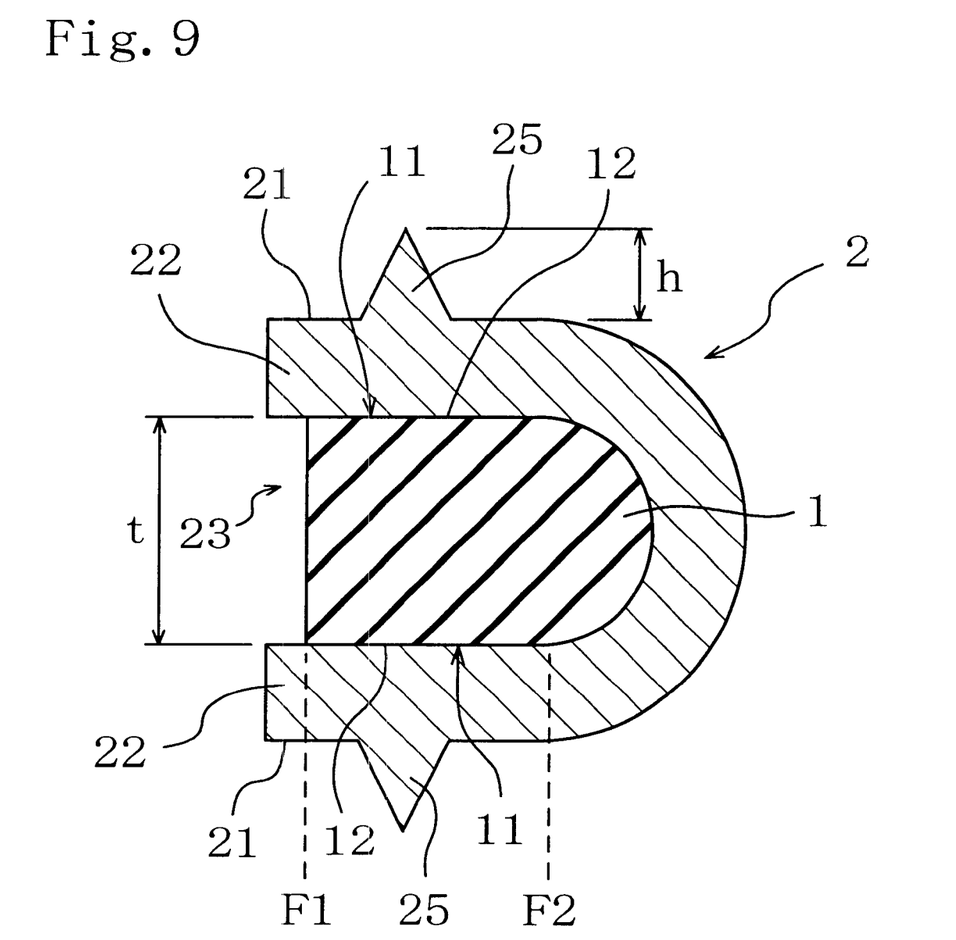
FIG. 9 shows an enlarged cross-sectional view of the jacket seal in a relaxed state taken along line B—B of FIG. 7.

A second embodiment of the present invention is shown in FIGS. 7–9. The present embodiment differs from the first embodiment in that in the former the vertex portion of the projection 25 of the metal jacket 2 is not flat, but is triangularly point-shaped. Corresponding elements of the present embodiment to the first embodiment have been assigned the same reference numerals. If the endmost portion of the projection 25 is accurately manufactured so as to prevent the occurrence of a burr or a flash, this will prevent the direction in which the endmost portion collapses from varying. And the end of the projection 25 is triangularly point-shaped, so that when the jacket seal 10 is clamped by the seal surface 32 of the being-sealed member, the projection 25 is easily crushed thereby providing the advantage of securing adhesion with respect to the seal surface.

Other Embodiments

The present invention is not limited to the above-described embodiments, and it therefore is variable in various manners. For example, it is possible for the projection 25 to have various cross sections other than the foregoing shapes including a cross section of triangular shape and a cross section of trapezoid shape formed by making the vertex portion 26 flat, such as a cross section of semi-circular shape, a cross section of semi-elliptical shape, and other cross sections of other shapes, and it is preferable to flatten the vertex portion 26 which abuts against the seal surface 32 of the sealed member. When forming such a flat vertex portion 26, the width thereof can be set to any adequate value.

Moreover, with regard to the shape of the metal jacket 2, its cross-sectional shape is not limited to the shape of letter U. The shape of letter V and the shape of Japanese katakana letter "ko" may be used. If these shapes are employed, however, this creates a corner portion in the metal jacket 2. Accordingly, when seal clamping pressure is applied, stress concentration is likely to occur at such a corner portion. This may result in causing the metal jacket 2 to undergo plastic deformation.

Working Manners of the Jacket Seal

Figure 10:
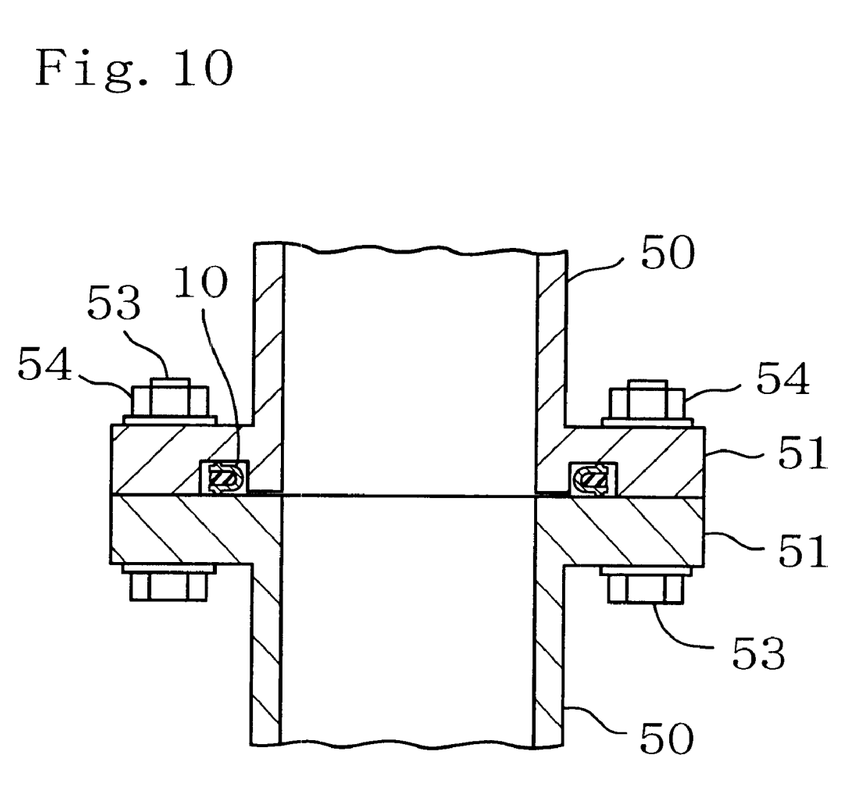
FIG. 10 shows a cross-sectional view illustrating an application of the jacket seal.

Sealing is achieved by placing the jacket seal 10 between members to be sealed. FIG. 10 shows an example in which the jacket seal 10 is placed at a joint between pipes 50 of a vacuum apparatus. In other words, the jacket seal 10 is mounted in an annular seal groove 52 formed in an end surface of a connection flange 51 of one of the pipes 50 and is clamped between a bottom surface of the seal groove 52 (a seal surface) and an end surface (a seal surface) of the other pipe 50 by bolts 53 and nuts 54.

Figure 11:
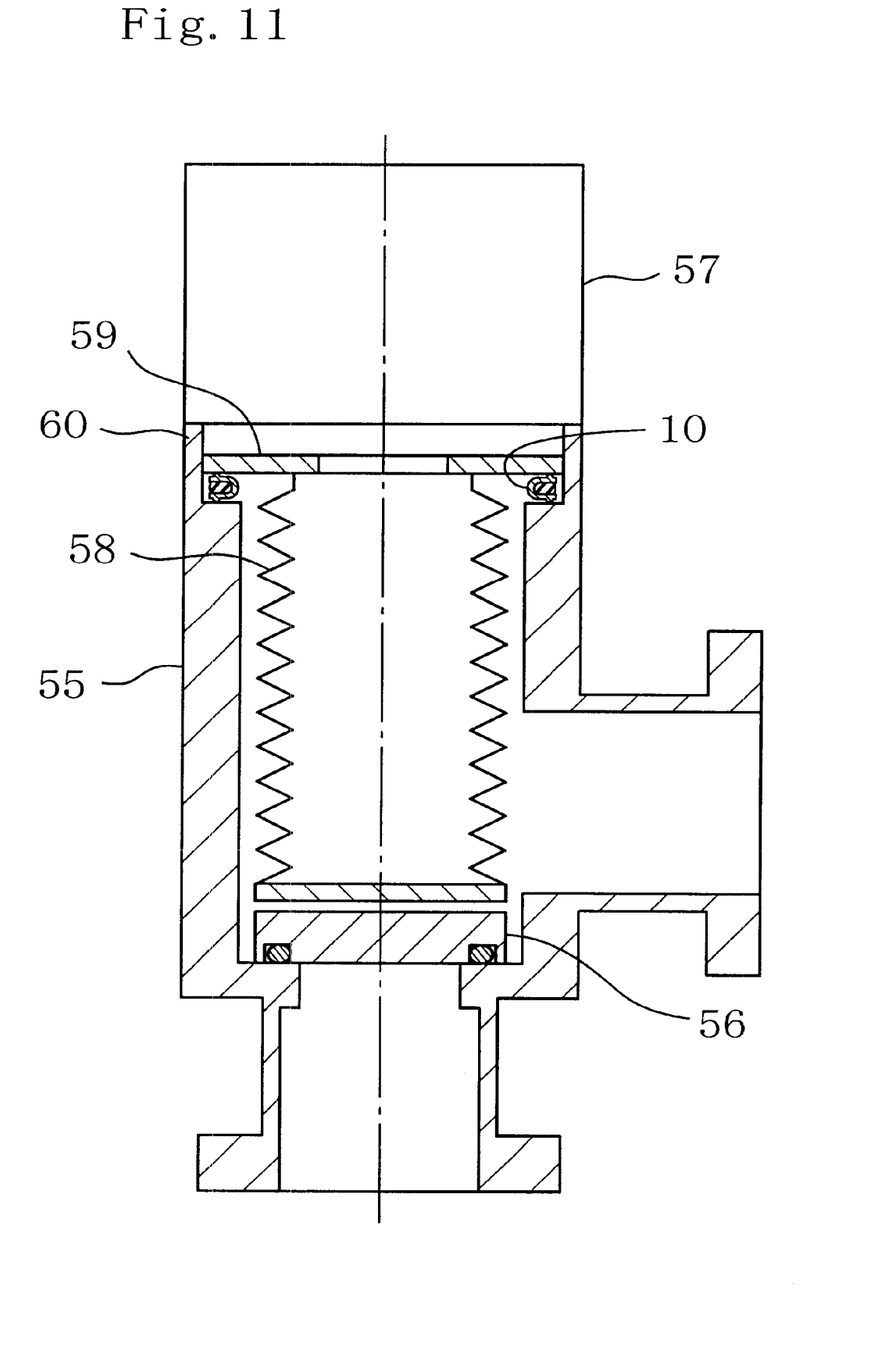
FIG. 11 shows a cross-sectional view illustrating another application of the jacket seal.

Referring to FIG. 11, there is shown an example in which the jacket seal 10 is used in an L-shaped valve of a vacuum apparatus. FIG. 11 shows a valve container 55 with an L-shaped vacuum passage formed therein, a valve element 56 for closing and opening the L-shaped passage, an actuator 57 for driving the valve element 56, and a bellows 58. The jacket seal 10 is clamped between an end surface (a seal surface) around an actuator-mounting opening of the valve container 55 and a seal plate 59 of the actuator 57. The jacket seal 10 makes application of heavy clamping pressure unnecessary, and, for example, there is no need to increase the thickness of a wall 60 around the mounting opening of the valve container 55.

Figure 12:
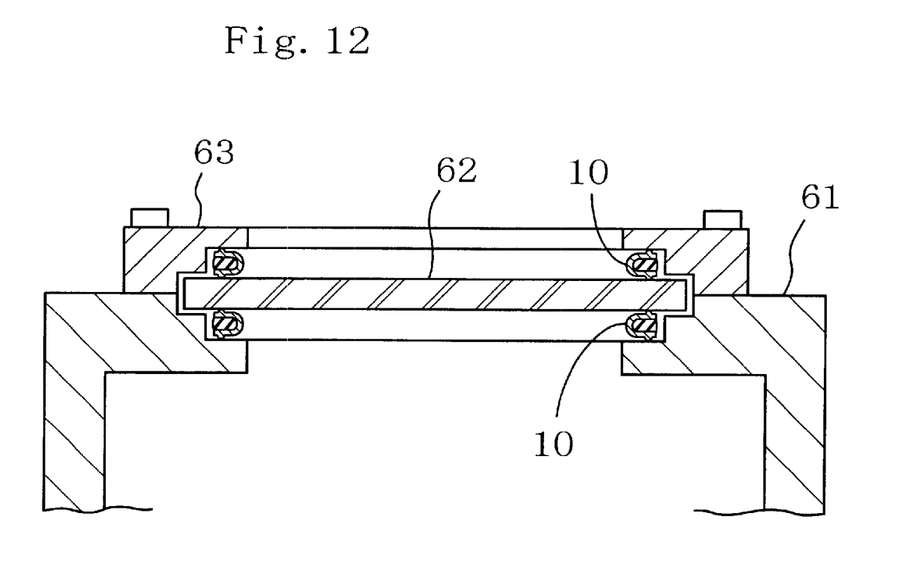
FIG. 12 shows a cross-sectional view illustrating still another application of the jacket seal.

FIG. 12 shows an example in which the jacket seal 10 is employed to seal an inspection window glass 62 of a vacuum container 61. The jacket seal 10 is placed between the window glass 62 and a seal surface of the vacuum container 61 as well as between the window glass 62 and a seal surface of a presser plate 63.

What is claimed is:

1. A jacket seal comprising (a) a metal jacket having an annular web portion and a pair of flange portions projecting outward from sides of said web portion, respectively, and (b) an elastic member accommodated in said metal jacket, wherein said web portion faces the space to be sealed;

said metal jacket includes a projection which is annularly formed at an exterior surface of each of said flange portions and which abuts against a seal surface of a member being sealed, and said elastic member is a solid molded from rubber, elastomer or expanded plastic and includes a flat portion which abuts against an interior surface of each of said flange portions of said metal jacket.

2. The jacket seal according to claim 1, wherein said flat portion is in surface-to-surface contact with a position of said interior surface of each of said flange portions of said metal jacket corresponding to said projection.

3. The jacket seal according to claim 1, wherein said projection has a cross section of approximately triangular shape whose vertex angle is 50 degrees or more.

4. A jacket seal comprising (a) a metal jacket having an annular web portion and a pair of flange portions projecting outward from sides of said web portion, respectively, and (b) an elastic member accommodated in said metal jacket, wherein said web portion faces the space to be sealed;

said metal jacket includes a projection which is annularly formed at an exterior surface of each of said flange portions and said projection has a vertex portion which is formed flat over the full circumferential length so as to abut against a seal surface of a member being sealed; and said elastic member is a solid molded from rubber, elastomer or expanded plastic.

5. The jacket seal according to claim 4, wherein said elastic member includes a flat portion which abuts against a position of an interior surface of each of said flange portions of said metal jacket corresponding to said projection.

6. The jacket seal according to any one of claims 1–5, wherein said elastic member has a cross section of approximately D-letter shape.

7. A jacket seal comprising (a) a metal jacket having an annular web portion and a pair of flange portions projecting outward from sides of said web portion, respectively, and (b) an annular elastic member accommodated in said metal jacket, wherein said web portion faces the space to be sealed;

said metal jacket includes a projection which is annularly formed at an exterior surface of each of said flange portions and which abuts against a seal surface of a member being sealed, and said elastic member is a solid molded from rubber, elastomer or expanded plastic and includes a contact portion which establishes contact with a position of an interior surface of each of said flange portions of said metal jacket corresponding to said projection at a width greater than the width of said projection and at an approximately uniform pressure, in a relaxed state in which no clamping pressure is acting on said metal jacket.

8. A jacket seal comprising (a) a metal jacket having an annular web portion and a pair of flange portions projecting inward or outward from sides of said web portion, respectively, and (b) an annular elastic member accommodated in said metal jacket, said jacket seal being clamped between seal surfaces of members being sealed and, in order to prevent components of said elastic member from being emitted into either one of an inner space and an outer space, said -web portion is directed toward one of said spaces and said flange portions at both said sides thereof are formed so as to project toward the other of said spaces, thereby to prevent a fluid from communicating between said inner space and said outer space, wherein said metal jacket includes a projection which is annularly formed at an exterior surface of each of said flange portions and which abuts against said seal surface, and said elastic member is a solid molded from rubber, elastomer or expanded plastic and establishes surface-to-surface contact with a position of an interior surface of each of said flange portions of said metal jacket corresponding to said projection at a width greater than the width of said projection, in a relaxed state in which no clamping pressure is acting on said metal jacket.

9. A jacket seal comprising (a) a metal jacket having an annular web portion and a pair of flange portions projecting outward from sides of said web portion, respectively, and (b) an annular elastic member accommodated in said metal jacket, wherein said web portion faces the space to be sealed;

said metal jacket includes a projection which is annularly formed at an exterior surface of each of said flange portions and which abuts against, a seal surface of a member being sealed, said elastic member is a solid molded from rubber, elastomer or expanded plastic and includes a contact portion which establishes contact with a position of an interior surface of each of said flange portions of said metal jacket corresponding to said projection at an approximately uniform pressure, in a relaxed state in which no clamping pressure is acting on said metal jacket, and an endmost portion of said projection is positioned within a region corresponding to the width of said contact portion.

10. A jacket seal comprising (a) metal jacket having an annular web portion and a pair of flange portions projecting inward or outward from sides of said web portion, respectively, and (b) an annular elastic member accommodated in said metal jacket, said jacket seal being clamped between seal surfaces of members being sealed and, in order to prevent components of said elastic member from being emitted into either one of an inner space and an outer space, said web portion is directed toward one of said spaces and said flange portions at both said sides thereof are formed so as to project toward the other of said spaces, thereby to prevent a fluid from communicating between said inner space and said outer space, wherein said metal jacket includes a projection which is annularly formed at an exterior surface of each of said flange portions and which abuts against said seal surface, said elastic member is a solid molded from rubber, elastomer or expanded plastic and establishes surface-to-surface contact with a position of an interior surface of each of said flange portions of said metal jacket corresponding to said projection, in a relaxed state in which no clamping pressure is acting on said metal jacket, and an endmost portion of said projection is positioned within a region corresponding to the width of the surface-to-surface contact.

11. A jacket seal comprising:

a metal jacket having an annular web portion and a pair of flange portions projecting inward or outward from sides of said web portion, respectively, and a rubber elastic member adhered to interior surface of said web portion of said metal jacket and interior surfaces of said flange portions at both said sides of said web portion by vulcanization.

12. The jacket seal according to claim 11, wherein said metal jacket includes a projection which is annularly formed at an exterior surface of each of said flange portions and which abuts against a seal surface of a member being sealed.

* * * * *